(12) United States Patent
Enomoto et al.

(10) Patent No.: US 11,164,685 B2
(45) Date of Patent: Nov. 2, 2021

(54) WIRE HARNESS, WIRE HARNESS MANUFACTURING METHOD AND WIRE HARNESS MANUFACTURING DEVICE

(71) Applicant: YAZAKI CORPORATION, Tokyo (JP)

(72) Inventors: Satoshi Enomoto, Utsunomiya (JP); Masashi Nakamura, Utsunomiya (JP); Shinichi Tadokoro, Utsunomiya (JP); Tomokazu Kato, Utsunomiya (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/924,209

(22) Filed: Jul. 9, 2020

(65) Prior Publication Data

US 2021/0012931 A1  Jan. 14, 2021

(30) Foreign Application Priority Data

Jul. 9, 2019  (JP) .............................. JP2019-127319

(51) Int. Cl.

| | |
|---|---|
| *H01B 13/012* | (2006.01) |
| *H01R 4/22* | (2006.01) |
| *H02G 1/06* | (2006.01) |
| *H02G 3/04* | (2006.01) |
| *B29C 35/08* | (2006.01) |
| *B60R 16/02* | (2006.01) |

(52) U.S. Cl.
CPC ....... *H01B 13/012* (2013.01); *B29C 35/0805* (2013.01); *B60R 16/0215* (2013.01); *H01R 4/22* (2013.01); *H02G 1/06* (2013.01); *H02G 3/04* (2013.01); *B29C 2035/0827* (2013.01)

(58) Field of Classification Search
CPC .............. H01B 13/012; B29C 35/0805; B29C 2035/0827; B60R 16/0215; H01R 4/22; H02G 1/06; H02G 3/04
USPC ....................................................... 174/72 A
See application file for complete search history.

(56) References Cited

U.S. PATENT DOCUMENTS

| | | | | |
|---|---|---|---|---|
| 4,923,537 | A | * | 5/1990 | Matsushima ....... B29C 44/1271 156/48 |
| 6,071,446 | A | * | 6/2000 | O'Brien ................ B29C 33/123 264/261 |
| 10,340,062 | B2 | * | 7/2019 | Endo ...................... H01B 13/26 |
| 2008/0061478 | A1 | * | 3/2008 | Tanaka ................... B29C 45/37 264/478 |
| 2011/0174218 | A1 | | 7/2011 | Jin |
| 2018/0047482 | A1 | * | 2/2018 | Endo ........................ H01B 7/36 |

FOREIGN PATENT DOCUMENTS

| | | |
|---|---|---|
| EP | 1 346 961 A1 | 9/2003 |
| JP | 2003-7152 A | 1/2003 |
| JP | 2005-347167 A | 12/2005 |
| JP | 2009-130981 A | 6/2009 |
| JP | 2010-231978 A | 10/2010 |

(Continued)

*Primary Examiner* — Timothy J Thompson
*Assistant Examiner* — Michael F McAllister
(74) *Attorney, Agent, or Firm* — Kenealy Vaidya LLP

(57) ABSTRACT

A wire harness includes: a harness main body. The harness main body includes a plurality of electric wires and a binding portion. The biding portion is configured to bind the plurality of electric wires. The binding portion is formed by a cured photocurable resin.

7 Claims, 11 Drawing Sheets

(56) References Cited

FOREIGN PATENT DOCUMENTS

| | | |
|---|---|---|
| JP | 2012-174468 A | 9/2012 |
| JP | 2014-155345 A | 8/2014 |
| WO | 2019/120864 A1 | 6/2019 |

* cited by examiner

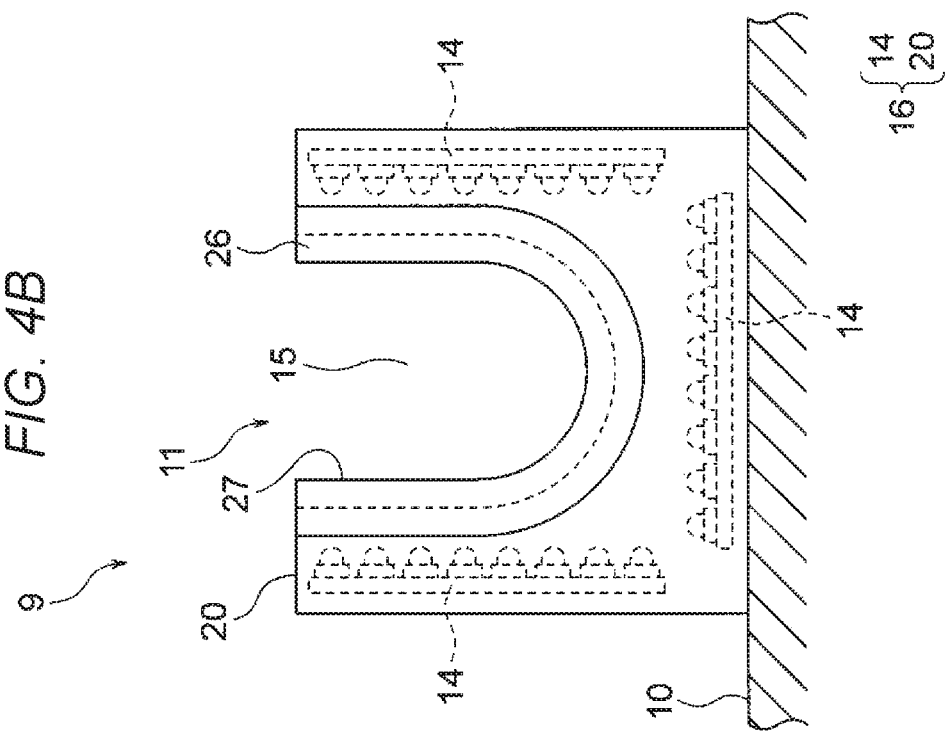
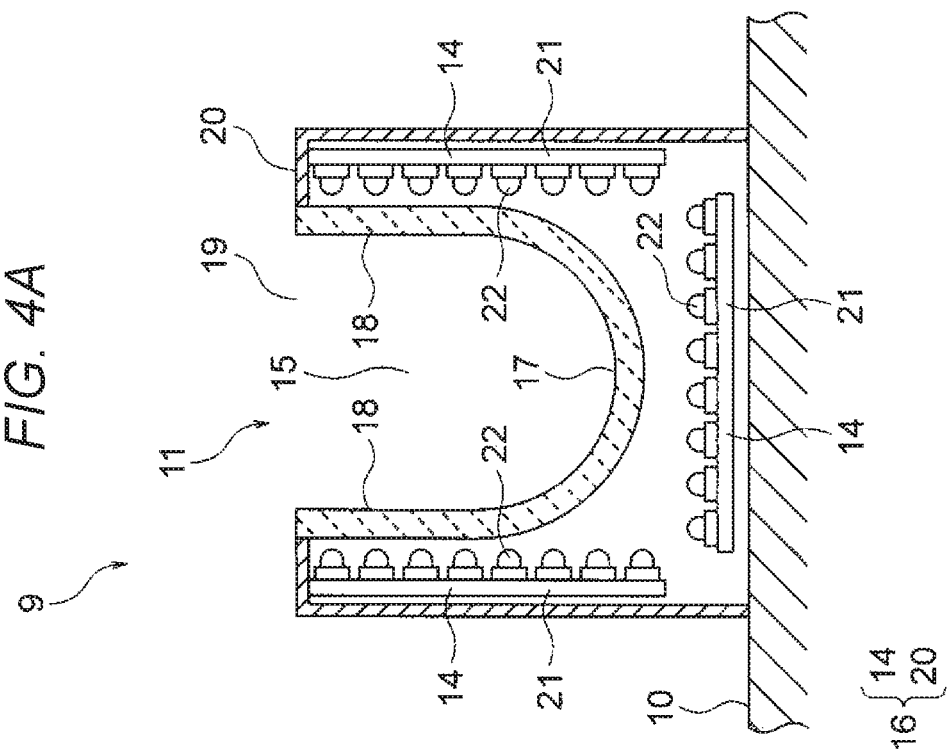

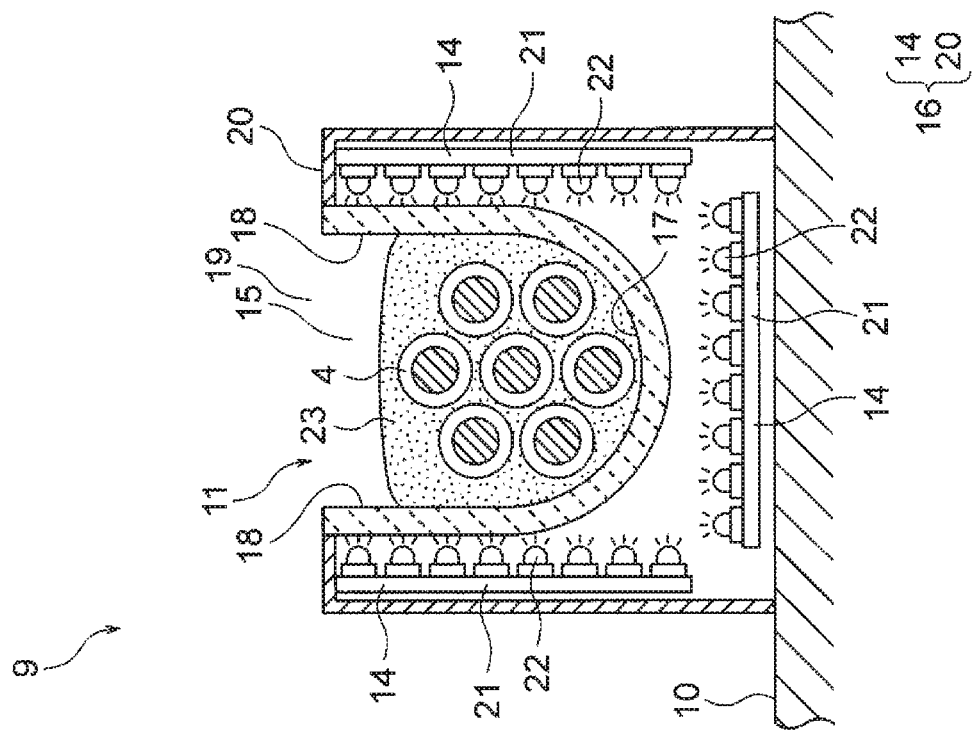
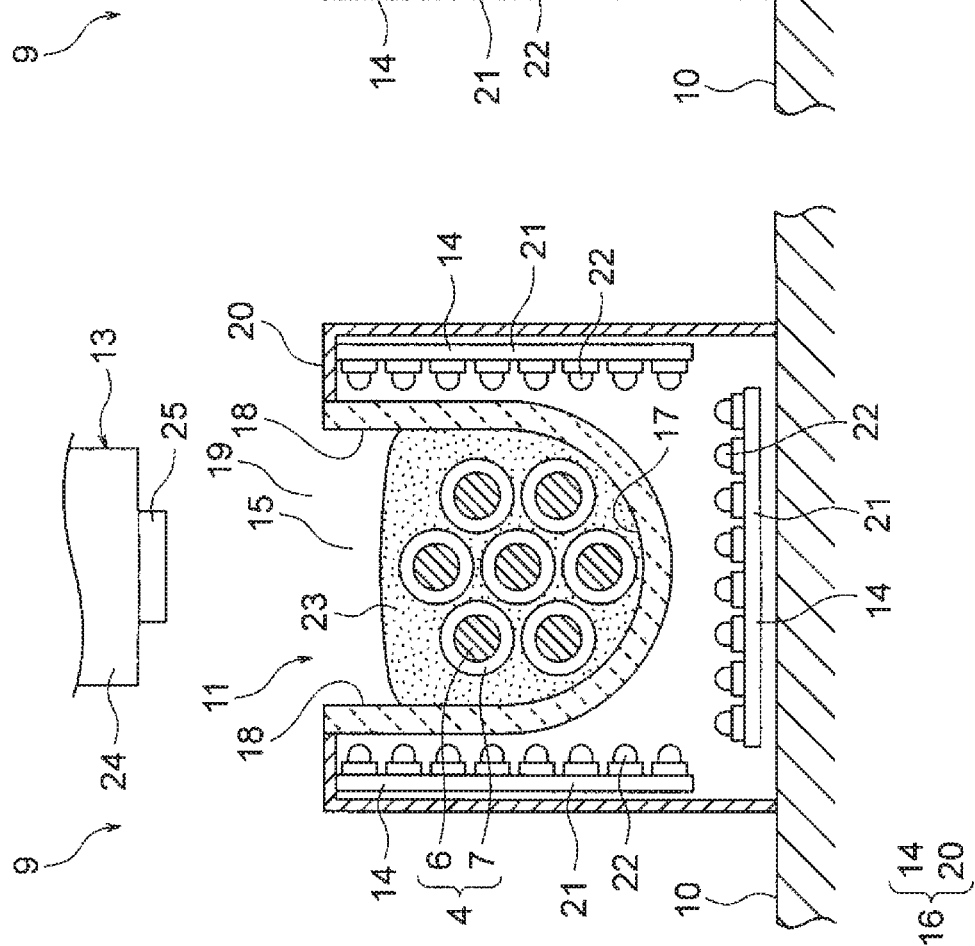

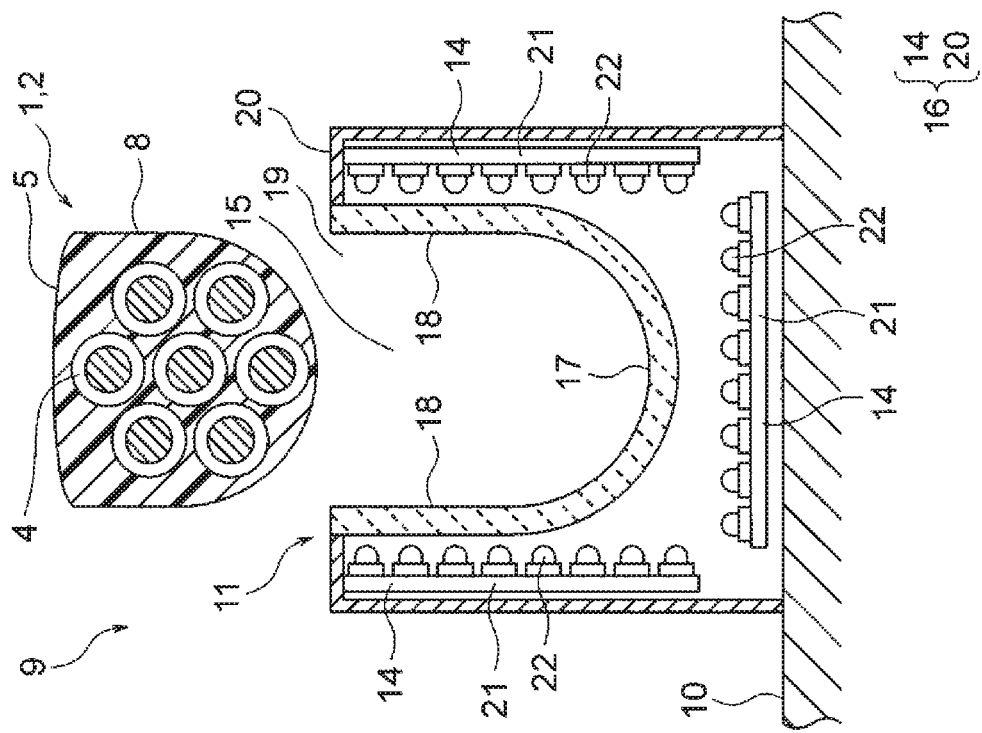
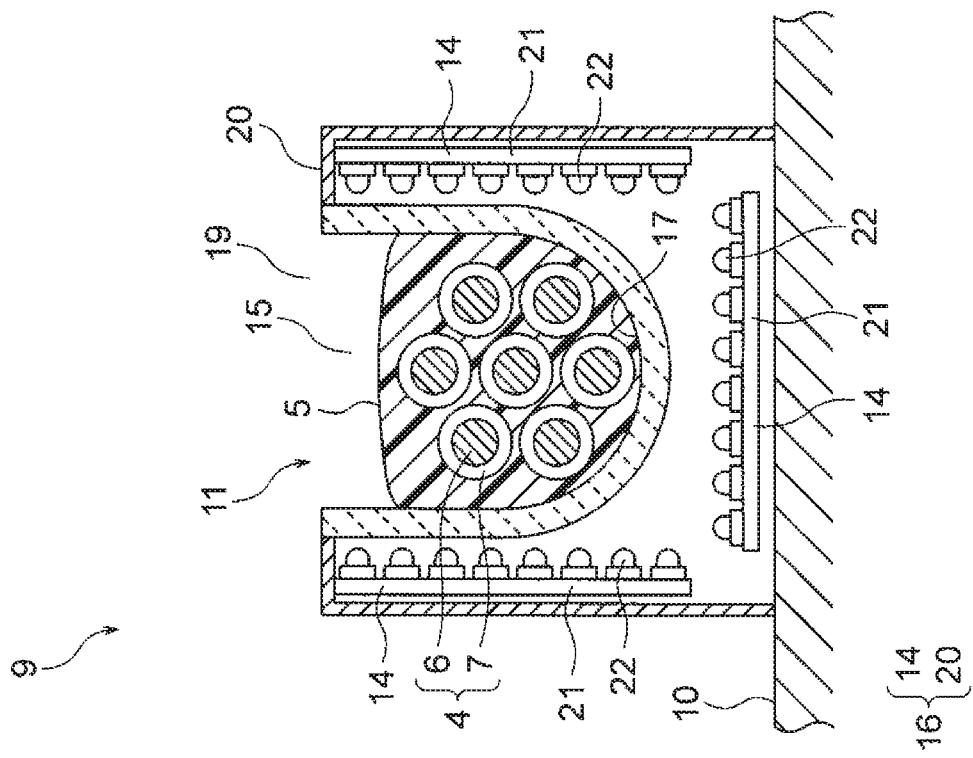

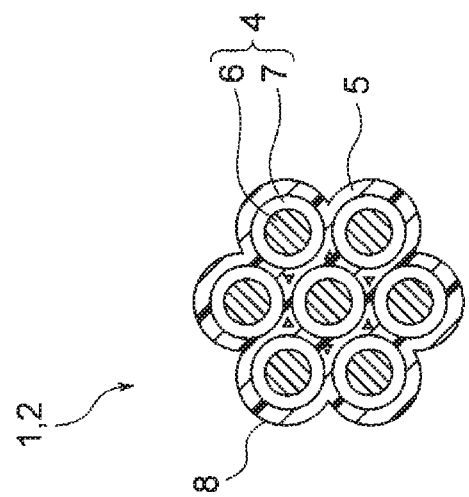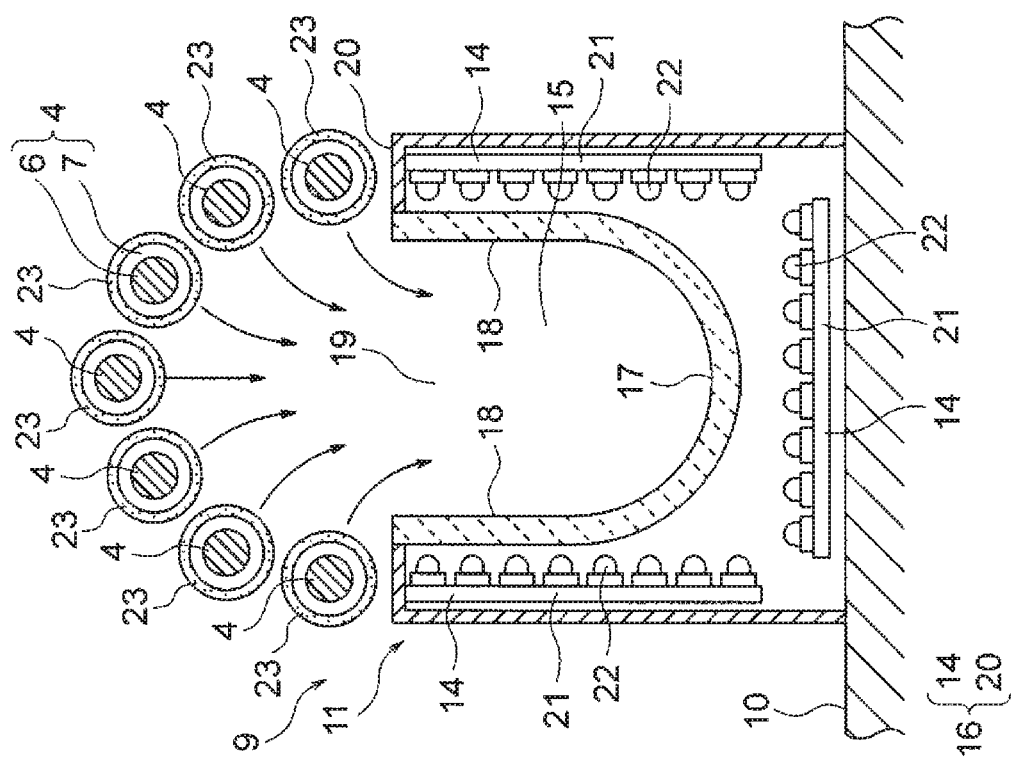

WIRE HARNESS, WIRE HARNESS MANUFACTURING METHOD AND WIRE HARNESS MANUFACTURING DEVICE

CROSS-REFERENCES TO RELATED APPLICATIONS

This application is based on and claims priority from Japanese Patent Application No. 2019-127319 filed on Jul. 9, 2019, the entire contents of which are incorporated herein by reference.

FIELD

Aspects of the present invention relate to a wire harness including a binding portion in a harness main body, and also relate to a method and a device for manufacturing the wire harness.

BACKGROUND

In an automobile, for example, a wire harness is wired in an appropriate route for electrical connection between devices. The wire harness includes a plurality of electric wires, which are bound by tape winding. Examples of a method other than the tape winding include a method of binding a plurality of electric wires by thermal welding as disclosed in JP-A-2003-007152.

SUMMARY

According to the related-art technology described above, since coatings of the plurality of electric wires are thermally welded and bound, conductors under the coatings may be affected unless the coatings have a sufficient thickness. In a case of binding by the tape winding, winding is performed according to a length of a harness main body, which may take a long work time.

Aspects of the present invention have been made in view of the above circumstances, and an object thereof is to provide a wire harness, a wire harness manufacturing method and a wire harness manufacturing device capable of improving a binding state and binding workability.

In a first aspect of the present invention, there is provided a wire harness including: a harness main body including a plurality of electric wires and a binding portion configured to bind the plurality of electric wires, wherein the binding portion is formed by a cured photocurable resin.

According to the first aspect of the present invention, the binding portion is formed by the cured photocurable resin. Consequently, as compared to the thermal welding, electric wire conductors are not affected and as a result, a binding state can be improved, and as compared to the tape winding, winding is eliminated and as a result, binding workability can be significantly improved.

In a second aspect of the present invention, there is provided the wire harness according to the first aspect, wherein the binding portion includes at least one binding member provided on an intermediate portion of the harness main body along an axial direction of the harness main body and surrounding the plurality of electric wires entirely in a circumferential direction of the harness main body.

According to the second aspect of the present invention, since the binding portion is formed in the intermediate portion of the harness main body as described above, the electric wires in a binding range can be protected from outside, in addition to improvement of the biding state and binding workability. This can contribute to reduction of exterior members such as protectors.

In a third aspect of the present invention, there is provided the wire harness according to the first or second aspect, wherein the binding portion has a shape conforming to an axis of the harness main body, the shape having at least one of a bent shape and a straight shape.

According to the third aspect of the present invention, since the binding portion is cured so as to have a shape conforming to the axis of the harness main body, the binding portion can have a function of maintaining a shape of the wire harness required for wiring. Further, this can contribute to reduction of members for maintaining the wiring shape.

In a fourth aspect of the present invention, there is provided a wire harness manufacturing method for manufacturing a wire harness including a harness main body including a binding portion configured to bind a plurality of electric wires, the wire harness manufacturing method including: performing a resin provision to provide a photocurable resin on a portion of the plurality of electric wires where the biding portion of the harness main body are to be formed; and performing a resin curing to cure the photocurable resin provided on the portion of the plurality of electric wires by irradiating the photocurable resin with light.

According to the fourth aspect of the present invention, the binding portion is formed through the resin provision and the resin curing. Consequently, as compared to the thermal welding, electric wire conductors are not affected and as a result, a binding state can be improved. Further, as compared to the tape winding, winding is eliminated and as a result, binding workability can be significantly improved.

In a fifth aspect of the present invention, there is provided the wire harness manufacturing method according to the fourth aspect of the present invention, wherein in the resin provision, the photocurable resin is provided on at least one position of an intermediate portion of the harness main body along an axial direction of the harness main body and surrounding the plurality of electric wires entirely in a circumferential direction of the harness main body.

According to the fifth aspect of the present invention, since the binding portion is formed in the intermediate portion of the harness main body as described above, the electric wires in a binding range can be protected from outside, in addition to improvement of the biding state and binding workability. This can contribute to reduction of exterior members such as protectors.

In a sixth aspect of the present invention, there is provided the wire harness manufacturing method according to the fourth or fifth aspect, wherein the light with which the photocurable resin is irradiated in the resin curing is emitted by a light source disposed in at least a bottom portion and a pair of side portions of an electric wire accommodation groove of a groove-shaped device configured to accommodate the plurality of electric wires.

According to the sixth aspect of the present invention, since the light source is disposed in the bottom portion and the pair of side portions of the electric wire accommodation groove, the photocurable resin can be cured uniformly and in a short time. Therefore, the binding state and the binding workability can be improved.

In a seventh aspect of the present invention, there is provided the wire harness manufacturing method according to any one of the fourth to sixth aspects of the present invention, wherein the resin provision includes: accommodating the plurality of electric wires in an electric wire accommodation groove of a groove-shaped device; and filling the electric wire accommodation groove with the photocurable resin in a state where the plurality of electric wires are accommodated in the electric wire accommodation groove.

According to a seventh aspect of the present invention, since the electric wire accommodation groove is filled with the photocurable resin in a state where the plurality of electric wires are accommodated in the electric wire accommodation groove, the resin provision can accurately and easily performed to a position where the binding portion is to be formed.

In an eighth aspect of the present invention, there is provided a wire harness manufacturing device for forming a wire harness including a harness main body including a binding portion configured to bind a plurality of electric wires, the wire harness manufacturing device including: a groove-shaped device including an electric wire accommodation groove configured to accommodate the plurality of electric wires; a provision device configured to provide a photocurable resin on a portion of the plurality of electric wires where the biding portion of the harness main body are to be formed; and a light source configured to cure the photocurable resin provided on the plurality of electric wires.

According to the eighth aspect of the present invention, the plurality of electric wires are accommodated and the photocurable resin is cured using the groove-shaped device. Consequently, as compared to the thermal welding, electric wire conductors are not affected and as a result, a binding state can be improved, and as compared to the tape winding, winding is eliminated and as a result, binding workability can be significantly improved.

In a ninth aspect of the present invention, there is provided the wire harness manufacturing device according to the eighth aspect of the present invention, wherein the light source is disposed in at least a bottom portion and a pair of groove portions of the electric wire accommodation groove.

According to the ninth aspect of the present invention, since the light source is disposed in at least a bottom portion and a pair of groove portions of the electric wire accommodation groove, the photocurable resin can be cured uniformly and in a short time. Further, since irradiation with light from the light source can be automatically performed, the binding workability can be further improved. In other words, productivity can be improved.

In a tenth aspect of the present invention, there is provided the wire harness manufacturing device according to the eighth or ninth aspect of the present invention, wherein the provision device includes a filling device configured fill the electric wire accommodation groove with the photocurable resin.

According to the tenth aspect of the present invention, since the filling device can fill the electric wire accommodation groove with the photocurable resin in a state where the plurality of electric wires are accommodated in the electric wire accommodation groove, the resin provision can accurately and easily performed to a position where the binding portion is to be formed. Further, since filling with the photocurable resin can be automatically performed, the binding workability can be further improved.

In an eleventh aspect of the present invention, there is provided the wire harness manufacturing device according to the tenth aspect of the present invention, further including: a jig plate; and an end portion receiving jig configured to receive an end portion of one of the plurality of wire harnesses, wherein the groove-shaped device is provided on the jig plate together with the end portion receiving jig, and wherein the filling device is installed above the jig plate, the filling device being movable automatically.

According to the eleventh aspect of the present invention, since the binding portion can be formed on the jig plate, the binding workability can be improved. That is, since it is not the case where the binding portion is formed at another location and then the harness main body is moved to the jig plate, work can be favorably performed.

In a twelfth aspect of the present invention, there is provided the wire harness manufacturing device according to any one of the eighth to eleventh aspect, the groove-shaped device includes a barrier portion configured to prevent the photocurable resin from flowing out of a portion where the binding portion is to be formed, and wherein the barrier portion has a slit configured to receive the plurality of electric wires.

According to the twelfth aspect, since the barrier portion is formed in the groove-shaped device, the photocurable resin can be prevented from flowing out. Thereby, since a shape of the binding portion is stabilized, the binding state can be improved. Since manufacture can be performed without worrying about a flow of the photocurable resin, the binding workability can be improved as a result.

According to the wire harness, the wire harness manufacturing method and the wire harness manufacturing device of aspects of the present invention, the binding state and the binding workability can be improved compared to the related art.

BRIEF DESCRIPTION OF DRAWINGS

FIG. 1A is a plan view showing a state in which a binding portion is formed, and FIG. 1B is a plan view showing a state in which binding portions are formed at a plurality of positions.

FIGS. 4A and 4B are views of the manufacturing device shown in FIG. 2 and FIG. 3. FIG. 4A is a cross-sectional view taken along line A-A, and FIG. 4B is a view of an end portion viewed from an arrow B direction.

FIG. 5A is a view of a first step in a resin filling step, and FIG. 5B is a view of a second step (a start state) in the resin filling step.

FIGS. 6A and 6B are views of the method for manufacturing the wire harness shown in FIGS. 1A and 1B. FIG. 6A is a view of the second step (an end state) in the resin filling step, and FIG. 6B is a view of a first step (a start state) in a resin curing step.

FIGS. 7A and 7B are views of the method for manufacturing the wire harness shown in FIGS. 1A and 1B. FIG. 7A is a view of the first step (an end state) in the resin curing step, and FIG. 7B is a view of a second step in the resin curing step.

FIGS. 11A and 11B are views showing a modification of the binding portion. FIG. 11A is a view of a first step in a resin filling step, and FIG. 11B is a cross-sectional view of the binding portion.

DETAILED DESCRIPTION

A wire harness includes a harness main body including a plurality of electric wires and a binding portion configured to bind the plurality of electric wires, and the binding portion is formed by a cured photocurable resin. Further, the binding portion includes at least one binding member provided on an intermediate portion of the harness main body along an axial direction of the harness main body and surrounding the plurality of electric wires entirely in a circumferential direction of the harness main body. That is, the binding portion is formed on the intermediate portion of the harness main body entirely along the axial direction of the harness main body and on the intermediate portion entirely in the circumferential direction of the harness main body (i.e., around the harness axis. Alternatively, the binding portion is formed at a plurality of positions of the intermediate portion along the axial direction of the harness main body and entirely around the harness axis.

A wire harness manufacturing device includes a groove-shaped device including an electric wire accommodation groove configured to accommodate a plurality of electric wires; a provision device configured to provide a photocurable resin on a portion of the plurality of electric wires where a biding portion of the harness main body are to be formed; and a light source configured to cure the photocurable resin provided on the plurality of electric wires. The light source is disposed at predetermined positions in a bottom portion and a pair of groove portions of the electric wire accommodation groove.

In a wire harness manufacturing method, a wire harness is manufactured by performing a resin provision to provide a photocurable resin on a portion of a plurality of electric wires where a biding portion of the harness main body are to be formed; and performing a resin curing to cure the photocurable resin provided on the portion of the plurality of electric wires by irradiating the photocurable resin with light.

Figure 1:
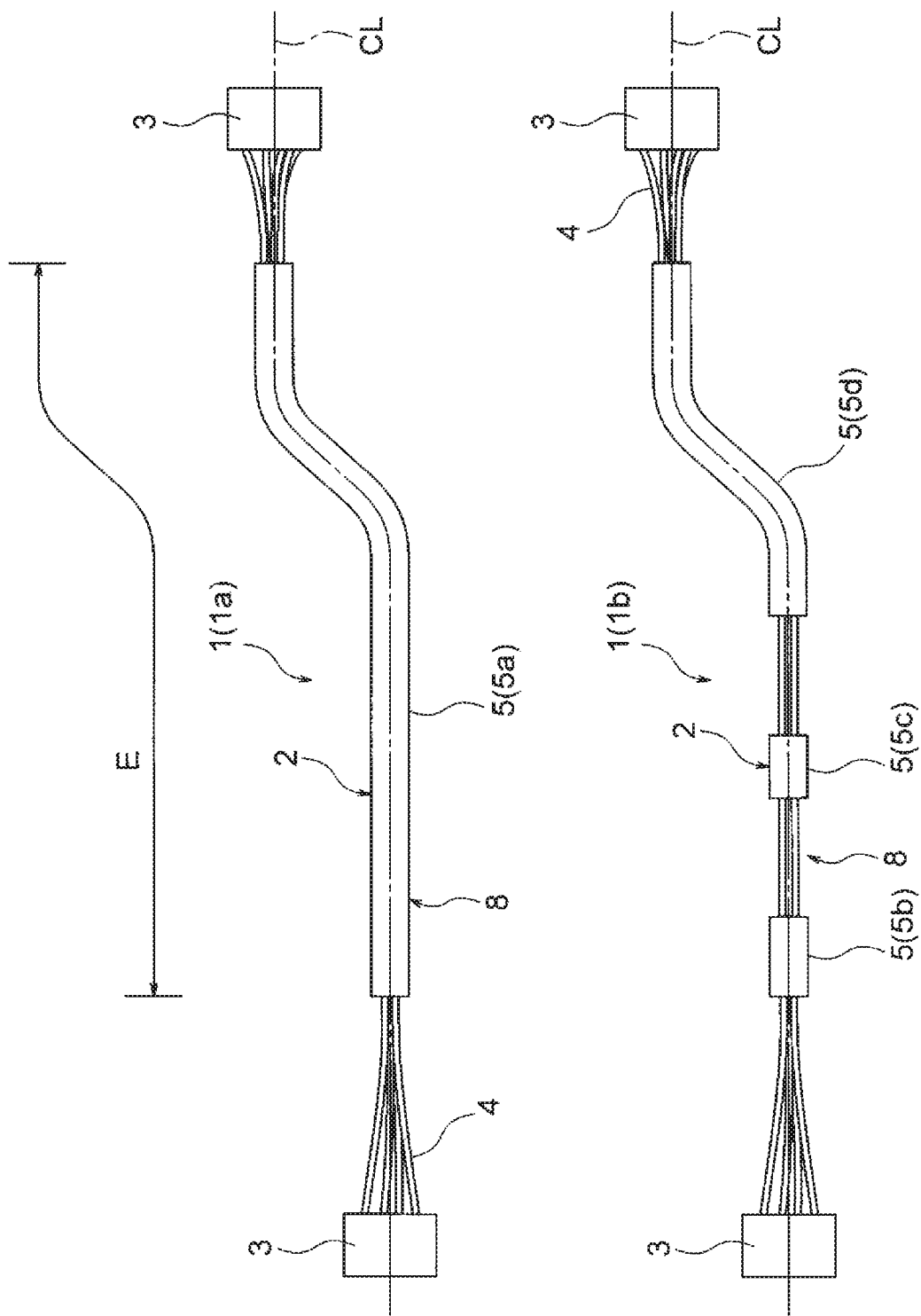
FIGS. 1A and 1B are views showing a wire harness according to an embodiment of the present invention.
Figure 2:
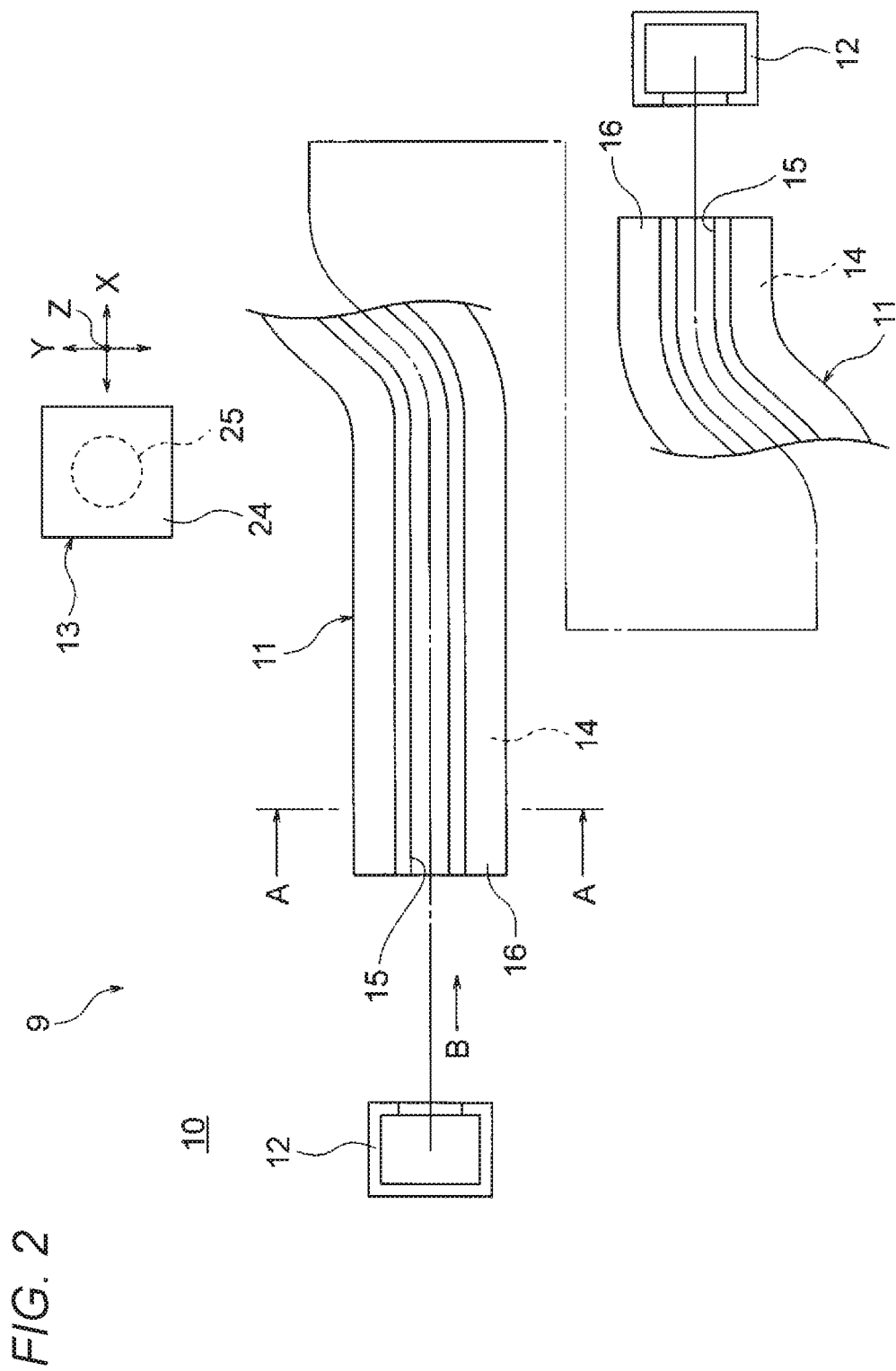
FIG. 2 is a plan view of a device for manufacturing the wire harness shown in FIG. 1A.
Figure 3:
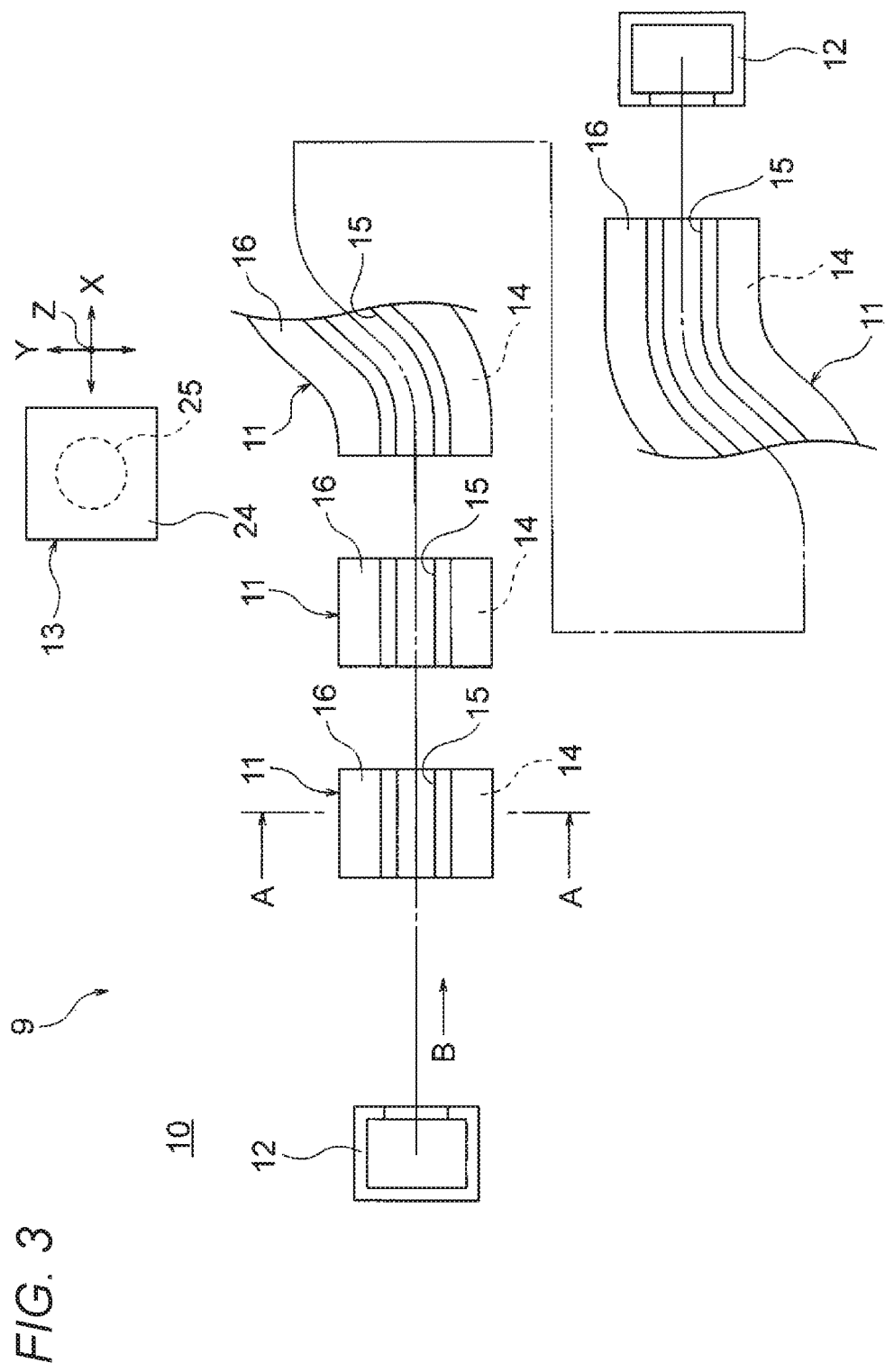
FIG. 3 is a plan view of the device for manufacturing the wire harness shown in FIG. 1B.
Figure 8:
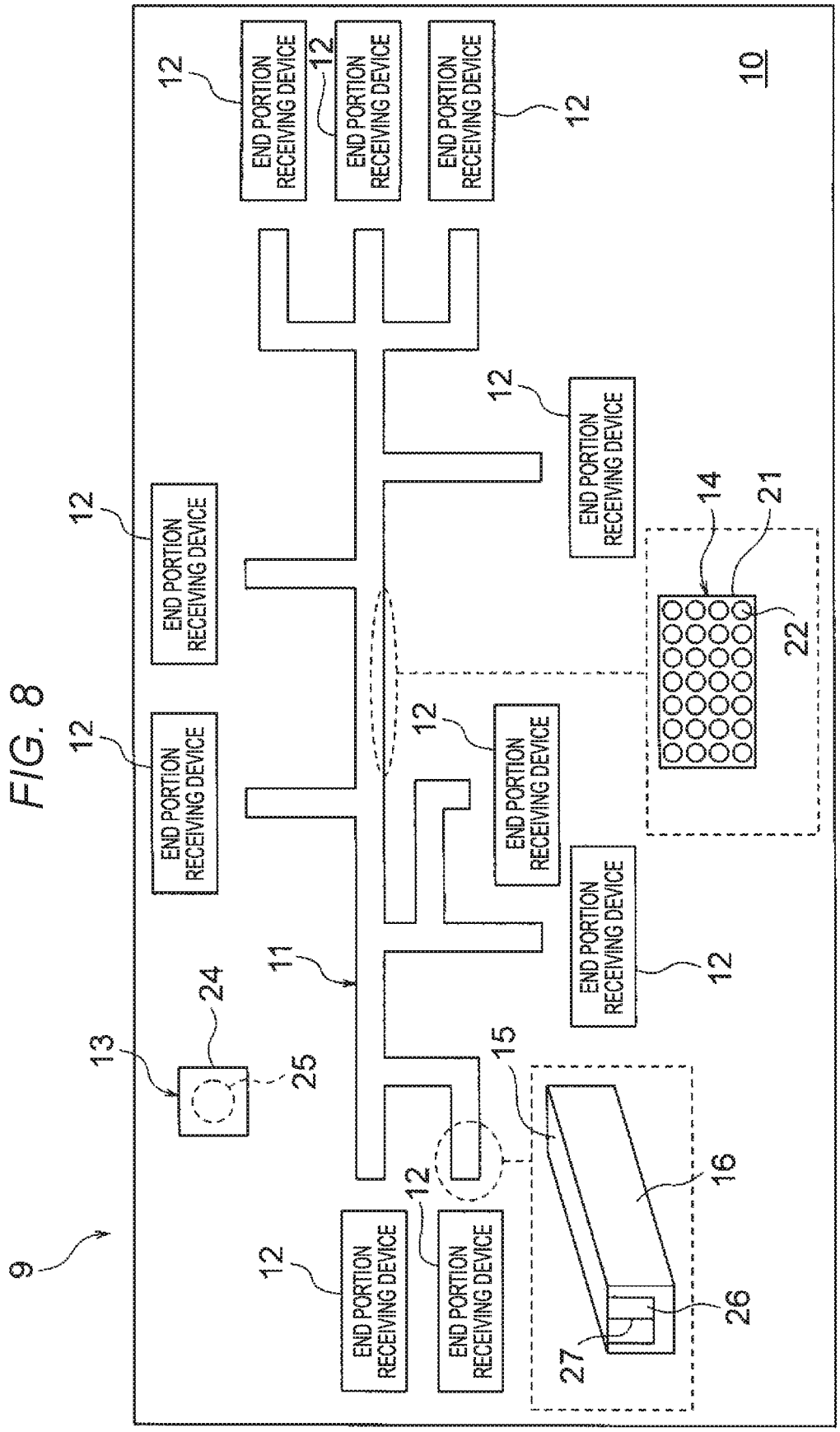
FIG. 8 is a schematic view showing a wire harness manufacturing device according to another embodiment of the present invention.
Figure 9:
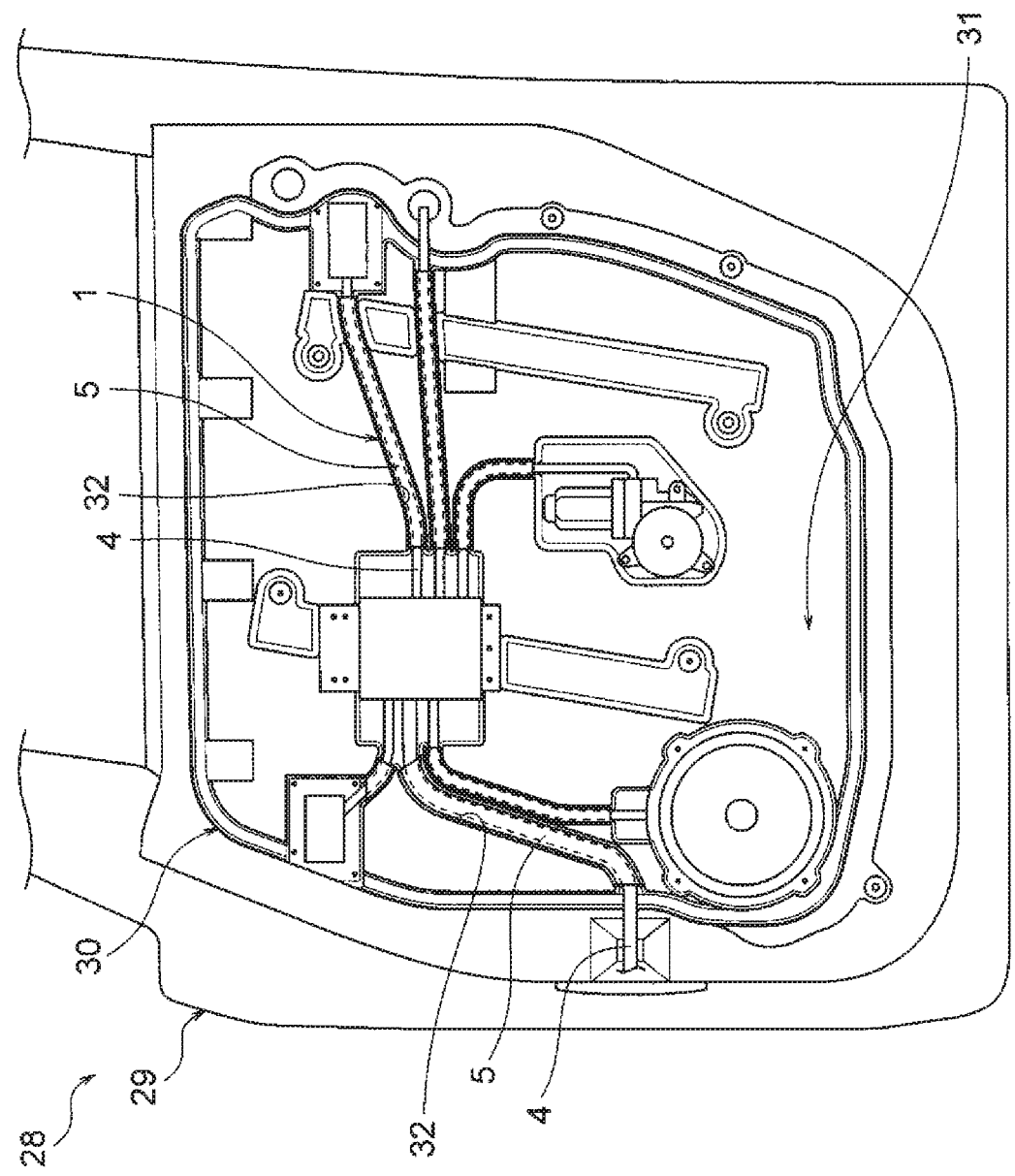
FIG. 9 is a view of wiring of the wire harness.
Figure 10:
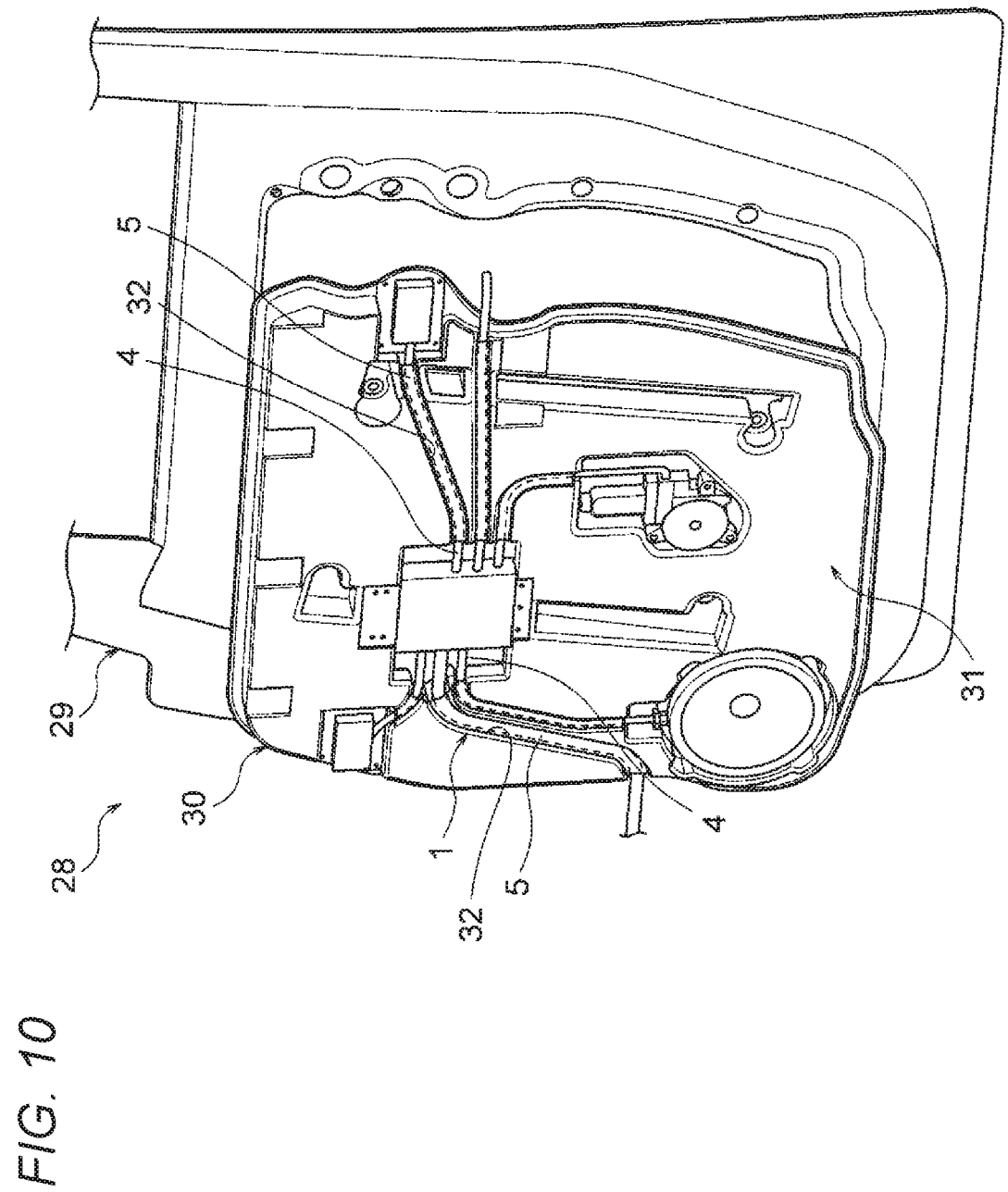
FIG. 10 is an exploded perspective view of a door shown in FIG. 9.

An embodiment will be described below with reference to the drawings. FIGS. 1A and 1B are views showing a wire harness according to an embodiment of the present invention. FIGS. 2 to 3 are plan views of a wire harness manufacturing device. FIGS. 4A and 4B are a cross-sectional view and an end portion view of the manufacturing device. FIGS. 5A, 5B to 7A and 7B are views of a wire harness manufacturing method, and FIG. 8 is a schematic view showing another embodiment of the wire harness manufacturing device. FIGS. 9 to 10 are views of wiring of the wire harness, and FIGS. 11A and 11B are views showing a modification of the binding portion.

<Wire Harness 1>

In FIGS. 1A and 1B, a wire harness 1 is provided for electrical connection between devices mounted on an automobile. The wire harness 1 is wired at a predetermined position of the automobile. The wire harness 1 includes a harness main body 2 and connectors 3 provided at end portions of the harness main body 2. In the present embodiment, for simplification of the drawings, description will be made in a form called a so-called sub-harness. As will be understood from the following description, the wire harness 1 is improved in a binding state and binding workability. The wire harness 1 is manufactured, for example, in a state (a shape) as shown in FIGS. 1A and 1B by a wire harness manufacturing device 9 (see FIGS. 2 and 3) and a wire harness manufacturing method, which will be described below.

Here, a reference numeral 1a indicates the wire harness shown in FIG. 1A, a reference numeral 1b indicates the wire harness shown in FIG. 1B, and a reference numeral 1 is used for a wire harness generic to the wire harness 1a and the wire harness 1b. Depending on a wiring position in the automobile, the wire harness 1 is provided with a known fixing member such as a clip or a known water-blocking member such as a grommet, which is attached to the harness main body 2 later. In some cases, the wire harness 1 is provided with an electrical connection box at an end portion thereof.

<Harness Main Body 2>

In FIGS. 1A and 1B, the harness main body 2 includes a plurality of electric wires 4 and a binding portion 5 as a portion that binds the plurality of electric wires 4. The harness main body 2 is formed in a length corresponding to a wiring position.

<Electric Wire 4 and Connector 3>

The plurality of electric wires 4 are used for various purposes such as power lines and signal lines, and have various thicknesses and materials. The electric wire 4 includes a conductor 6 (see FIGS. 5A and 5B) and an insulator 7 (see FIGS. 5A and 5B) covering the conductor. The conductor 6 is a conductive metal portion such as copper, copper alloy, aluminum or aluminum alloy, and is formed, for example, in a state in which strands are twisted together. The conductor 6 is formed in a circular cross section. The insulator 7 is an insulating resin portion such as a polyvinyl chloride resin, a polyethylene resin and a polypropylene resin, and is extruded around the conductor 6 into a cylindrical shape in cross section. The insulator 7 is a covering member for the conductor 6 and is formed in a predetermined thickness. Seven electric wires 4 as described above are shown in the present embodiment. The connector 3 includes a conductive terminal fitting provided at end portions of the electric wire 4 and an insulating connector housing (reference number omitted) that accommodates the terminal fitting. The connector 3 is formed as a portion for the electrical connection.

<Binding Portion 5>

In FIGS. 1A and 1B, the binding portion 5 is formed as the portion that binds the plurality of electric wires 4 as described above. The binding portion 5 is adopted as the portion that replaces a portion bound by thermal welding or tape winding as in the related art. The binding portion 5 is adopted as the portion that improves the binding state and the binding workability compared to the related art. The binding portion 5 is formed by curing a photocurable resin 23 described below. In other words, the binding portion 5 is formed by the photocurable resin 23 in a state of being cured, and the biding portion 5 is integrated with (adhered to) the plurality of electric wires 4. The biding portion 5 is formed on an intermediate portion 8 of the harness main body 2 and to surround the plurality of electric wires 4 entirely in a circumferential direction of the harness main body 2 (i.e., around a harness axis CL). The intermediate portion 8 is a portion of the harness main body 2 extending over a predetermined range excluding ends of the harness main body 2 along a direction of the harness axis CL, for example, a portion in a range indicated by an arrow E in FIGS. 1A and 1B. In a case of FIG. 1A, the binding portion 5 is formed entirely along the direction of a harness axis CL in the intermediate portion 8 of the harness main body 2 and entirely around the harness axis CL in the intermediate portion 8. In a case of FIG. 1B, the binding portion 5 is formed at a plurality of positions along the direction of the harness axis CL in the intermediate portion 8 and entirely around the harness axis CL in the intermediate portion 8. The binding portion 5 illustrated in FIG. 1A includes a single biding member 5a, and the biding portion 5 illustrated in FIG. 1B includes a plurality of biding members 5b, 5c, 5d, the binding member 5a is formed in a shape in which a bent shape (a right portion in the drawing) and a straight shape (a left portion in the drawing) to conform to the harness axis CL are continuous. Each of the binding members 5b, 5c is formed in a relatively short straight shape. The binding member 5d is formed in a bent shape conforming to the harness axis CL. The binding members 5b, 5c, 5d are arranged at predetermined intervals. Since the binding portion 5 is a portion where the photocurable resin 23 is cured, the binding portion 5 has a function of holding a shape necessary for wiring of the wire harness 1. Since the binding portion 5 is formed entirely around the harness axis CL to cover the plurality of electric wires 4, the binding portion 5 also has a function of wire protection. The binding portion 5 itself has a function as an exterior member such as a protector. The binding portion 5 as described above is formed by the wire harness manufacturing device 9 (see FIGS. 2 and 3) and the wire harness manufacturing method.

<Wire Harness Manufacturing Device 9>

In FIGS. 2 and 3, the wire harness manufacturing device 9 is a device that manufactures the wire harness 1 (see FIG. 1) such that the wire harness 1 has a shape suitable for wiring to the automobile, and includes a jig plate 10, a groove-shaped device 11, a end portion receiving jig 12, a filling device 13 and light sources 14. As will be understood from the following description, in the wire harness manufacturing device 9, arrangement of the light sources 14 is taken into consideration in order to cure the photocurable resin 23 described below. FIG. 2 shows the wire harness manufacturing device 9 for manufacturing the wire harness 1a shown in FIG. 1A, and FIG. 3 shows the wire harness manufacturing device 9 for manufacturing the wire harness 1b shown in FIG. 1B.

<Groove-Shaped Device 11>

In FIGS. 2 to 4A, 4B, the groove-shaped device 11 is a structure placed at a predetermined position of the jig plate 10, and is formed to conform to the bent shape and/or the straight shape of the binding portion 5 (the biding members 5a to 5d; see FIGS. 1A and 1B). The wire harness manufacturing device 9 shown in FIG. 2 includes a single groove-shaped device 11 for forming the biding member 5a, and the wire harness manufacturing device 9 shown in FIG. 3 includes three groove-shaped devices 11 for forming the biding members 5b, 5c, 5d, respectively. The groove-shaped device 11 includes an electric wire accommodation groove 15 and a light source device 16 integrated with the electric wire accommodation groove 15. The electric wire accommodation groove 15 is a groove capable of accommodating the plurality of (seven in the present embodiment) electric wires 4 and forming the binding portion 5 after the accommodation, and includes a groove bottom 17 and a pair of groove side surfaces 18 and is formed in a U-shaped cross section. The electric wire accommodation groove 15 is formed in a deep U-shaped cross section with a relatively large depth from a groove opening 19 to the groove bottom 17. The electric wire accommodation groove 15 is formed of a material that transmits light. The electric wire accommodation groove 15 is formed of a material capable of separating the binding portion 5 from the groove bottom 17 and the pair of groove side surfaces 18. The electric wire accommodation groove 15 is formed of a material capable of withstanding heat of the photocurable resin 23 described below and heat from the light source device 16. In the electric wire accommodation groove 15, the groove bottom 17 and the pair of groove side surfaces 18 are formed in a substantially specular shape, and are formed of a heat-resistant transparent resin material or glass. A device or a portion for heat dissipation may be provided in the light source device 16. A barrier portion 26 serving as a flow stopping portion of the photocurable resin 23 is formed at each end portion of the electric wire accommodation groove 15. In other words, the barrier portion 26 is configured to prevent the photocurable resin 23 from flowing out of a portion where the binding portion 5 is to be formed. A slit 27 into which the plurality of electric wires 4 are inserted (a slit 27 configured to receive the plurality of electric wires 4) is formed in the barrier portion 26.

<Light Source Device 16 and Light Source 14>

In FIGS. 2 to 4B, the light source device 16 is disposed outside the electric wire accommodation groove 15. The light source device 16 includes a case 20 and the light sources 14. As can be seen from this configuration, the light source device 16 is configured to integrate the light sources 14 with the electric wire accommodation groove 15. The case 20 includes upper walls disposed adjacent to the groove opening 19 of the electric wire accommodation groove 15 and a pair of side walls arranged at predetermined intervals further outward than the pair of groove side surfaces 18 of the electric wire accommodation groove 15, and is formed in a box shape as shown, for example. A plurality of light sources 14 is disposed inside the case 20. The light sources 14 are provided for curing by irradiating the photocurable resin 23 with light. The light sources 14 are disposed to respectively face the groove bottom 17 and the pair of groove side surfaces 18 of the electric wire accommodation groove 15. Alternatively, the light source 14 may be arranged to surround the electric wire accommodation groove 15 in a substantially U shape. That is, the light source 14 is disposed at least in a bottom portion and a pair of side portions of the electric wire accommodation groove 15. The light source 14 includes a substrate 21, light emitters 22 mounted on the substrate 21, and a control unit (not shown) that causes the light emitters 22 to emit light. A large number of light emitters 22 are provided on the substrate 21. The light emitters 22 are appropriately selected depending on a type of the photocurable resin 23. The light emitters 22 are arranged up to positions higher than a position where the photocurable resin 23 fills. That is, the light emitters 22 are arranged up to a position close to the groove opening 19 of the electric wire accommodation groove 15. This structure allows the photocurable resin 23 to be irradiated with light also from a groove opening 19 side. If the light sources 14 are arranged outside the groove opening 19, workability may be deteriorated, and interference with the filling device 13 may be generated.

<Filling Device 13 and Photocurable Resin 23>

In FIGS. 2, 3 and 5A, 5B, the filling device 13 is a device that discharges the photocurable resin 23 to the groove-shaped device 11 (the groove opening 19 of the electric wire accommodation groove 15) and fills the electric wire accommodation groove 15 with the photocurable resin 23, and a nozzle 25 is formed to protrude from a lower portion of a device main body 24. The filling device 13 is configured to be automatically movable in an X direction, a Y direction and a Z direction, for example. The photocurable resin 23 may manually fill with a dispenser. The photocurable resin 23 is a resin that is cured by irradiation with light from the light sources 14. Examples of the light include ultraviolet rays, visible rays, and infrared rays, and ultraviolet rays are adopted in the present embodiment. Therefore, in the present embodiment, an ultraviolet curable resin corresponds to the photocurable resin 23.

<End Portion Receiving Jig 12 and Others>

In FIGS. 2 and 3, the end portion receiving jig 12 is a receiving portion for the connector 3 (see FIGS. 1A and 1B) at the end portion of the wire harness 1, and is formed to be able to hold the connector 3 during manufacture of the wire harness 1. The end portion receiving jig 12 is placed at a predetermined position of the jig plate 10 similarly to the groove-shaped device 11. A known fork (not shown) may be provided on the jig plate 10 to support the plurality of electric wires 4.

<Wire Harness Manufacturing Method>

A manufacturing method (a manufacturing process) of the wire harness 1 (see FIG. 1) will be described with reference to FIGS. 5A, 5B to 7A, 7B. The wire harness 1 is manufactured through a resin filling step and a resin curing step in this order.

Figure 5A:
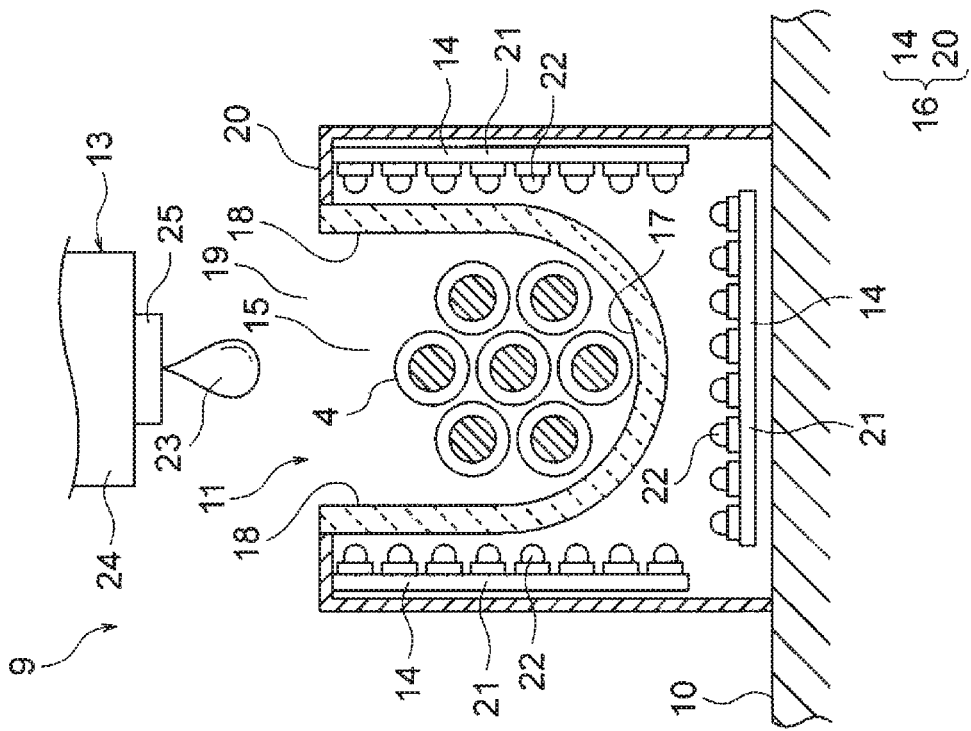
FIGS. 5A and 5B are views of a method for manufacturing the wire harness shown in FIGS. 1A and 1B.

FIG. 5A shows a first step in the resin filling step. In this step, the plurality of electric wires 4 are accommodated in the electric wire accommodation groove 15 of the groove-shaped device 11 to be in a state of being gathered to some extent. Specifically, the plurality of electric wires 4 are inserted into the slit 27 (see FIGS. 4A and 4B) of the barrier portion 26, thereby being accommodated in the state of being gathered to some extent.

Figure 5B:
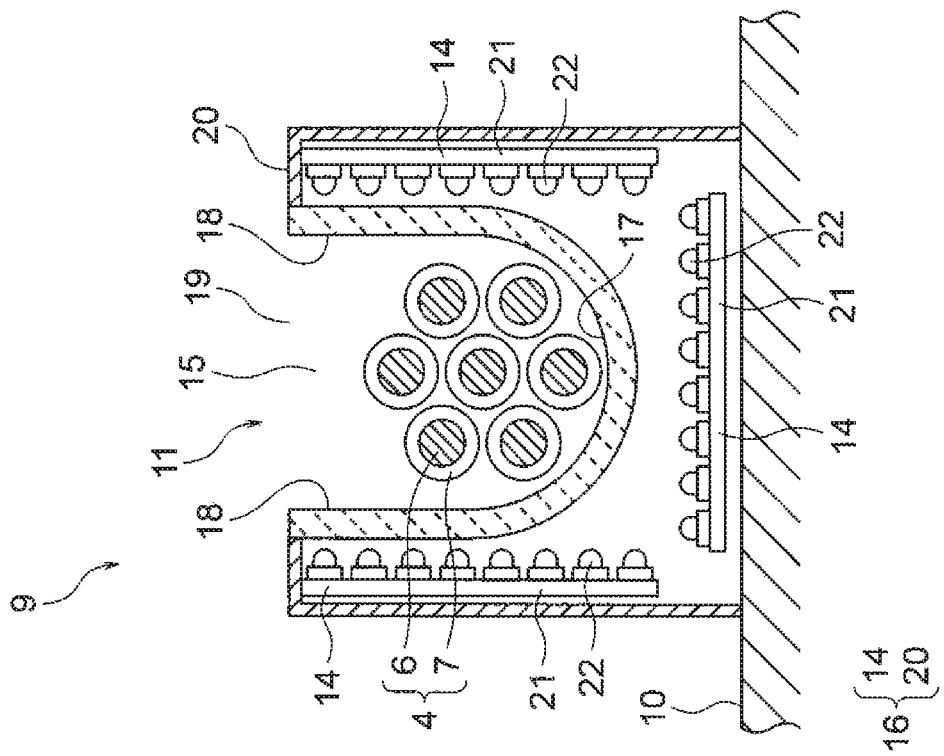

FIG. 5B shows a second step (a filling start state) in the resin filling step. In this step, the photocurable resin 23 is discharged from the nozzle 25 of the filling device 13. That is, filling with the photocurable resin 23 is started.

FIG. 6A shows the second step (a filling end state) in the resin filling step. In this step, the filling of the electric wire accommodation groove 15 with the photocurable resin 23 is completed.

FIG. 6B shows a first step (a curing start state) in the resin curing step. In this step, light is emitted from the light sources 14 by causing the light emitters 22 to emit the light. Curing of the photocurable resin 23 itself is started.

FIG. 7A shows the first step (a curing end state) in the resin curing step. In this step, the curing of the photocurable resin 23 is completed in a short time, and the binding portion 5 is formed.

FIG. 7B shows a second step in the resin curing step. In this step, the binding portion 5 is removed from the electric wire accommodation groove 15. With the above, the manufacture of the wire harness 1 (see FIGS. 1A and 1B) is completed.

<Another Embodiment of Wire Harness Manufacturing Device 9>

In FIG. 8, in the wire harness manufacturing device 9, the groove-shaped device 11 is formed to conform to the wiring route as illustrated. The end portion receiving jig 12 is arranged at each end portion of the groove-shaped device 11. The light source 14 is integrally arranged in the groove-shaped device 11. Such a wire harness manufacturing device 9 may be adopted.

<Example of Wiring of Wire Harness 1>

In FIGS. 9 and 10, the wire harness 1 is wired, for example, on a door 28 of an automobile. The door 28 includes a door main body 29 and a harness module 30 attached to the door main body 29. The wire harness 1 is wired to the harness module 30. The wire harness 1 is wired in such a state that the binding portion 5 is fitted into a groove 32 formed in a panel member 31 constituting the harness module 30 (this is merely an example).

<Modification of Binding Portion 5>

In FIGS. 11A and 11B, the binding portion 5 may be formed as follows. That is, the binding portion 5 as shown in FIG. 11B may be formed in a way that the photocurable resin 23 is applied to the electric wires 4 in advance, the electric wires 4 are accommodated in the electric wire accommodation groove 15 of the groove-shaped device 11, and then curing is performed by irradiation with light from the light sources 14. Since the irradiation of the light from the light sources 14 is uniformly performed on the electric wires 4, the binding portion 5 as shown can of course be formed.

The above-described embodiments describe, as a provision of the photocurable resin 23 to the electric wires 4, an example in which the groove-shaped device 4 in a state of accommodating the electric wires 4 is filled with the photocurable resin 23 and an example in which the photocurable resin 23 is applied to the electric wires 4 before the electric wires 4 are accommodated in the groove-shaped device. However, the present invention is not limited thereto, and any method and/or configuration may be adopted to the provision of the photocurable resin 23 to the electric wires 4 as long as the photocurable resin 23 in an uncured state is provided to a portion of the electric wires 4 where the binding portion 5 is to be formed.

<Effects>

As described above with reference to FIGS. 1A, 1B to 11A, 11B, according to the wire harness 1, the wire harness manufacturing method and the wire harness manufacturing device 9 of the embodiment of the present invention, since the binding portion 5 is formed by curing the photocurable resin 23. Consequently, as compared to the thermal welding, electric wire conductors are not affected and as a result, the binding state can be improved. Further, as compared to the tape winding, winding is eliminated and as a result, the binding workability can be significantly improved.

The present invention is not limited to the embodiments described above, and may be variously modified or changed without departing from the scope of the present invention.

The invention claimed is:

1. A wire harness manufacturing method for manufacturing a wire harness comprising a harness main body comprising a binding portion configured to bind a plurality of electric wires, the wire harness manufacturing method comprising:
    performing a resin provision to provide a photocurable resin on a portion of the plurality of electric wires where the biding portion of the harness main body are to be formed;
    performing a resin curing to cure the photocurable resin provided on the portion of the plurality of electric wires by irradiating the photocurable resin with light, and
    wherein the light with which the photocurable resin is irradiated in the resin curing is emitted by a light source disposed in at least a bottom portion and a pair of side portions of an electric wire accommodation groove of a groove-shaped device configured to accommodate the plurality of electric wires.

2. The wire harness manufacturing method according to claim 1,
    wherein in the resin provision, the photocurable resin is provided on at least one position of an intermediate portion of the harness main body along an axial direction of the harness main body and surrounding the plurality of electric wires entirely in a circumferential direction of the harness main body.

3. The wire harness manufacturing method according to claim 1, wherein the resin provision comprises:

accommodating the plurality of electric wires in the electric wire accommodation groove of the groove-shaped device; and filling the electric wire accommodation groove with the photocurable resin in a state where the plurality of electric wires are accommodated in the electric wire accommodation groove.

4. A wire harness manufacturing device for forming a wire harness comprising a harness main body comprising a binding portion configured to bind a plurality of electric wires, the wire harness manufacturing device comprising:

a groove-shaped device comprising an electric wire accommodation groove configured to accommodate the plurality of electric wires;

a provision device configured to provide a photocurable resin on a portion of the plurality of electric wires where the biding portion of the harness main body are to be formed; and a light source configured to cure the photocurable resin provided on the plurality of electric wires, wherein the light source is disposed in at least a bottom portion and a pair of side portions of the electric wire accommodation groove.

5. The wire harness manufacturing device according to claim 4, wherein the provision device comprises a filling device configured fill the electric wire accommodation groove with the photocurable resin.

6. The wire harness manufacturing device according to claim 5, further comprising:

a jig plate; and an end portion receiving jig configured to receive an end portion of one of the plurality of wire harnesses, wherein the groove-shaped device is provided on the jig plate together with the end portion receiving jig, and wherein the filling device is installed above the jig plate, the filling device being movable automatically.

7. The wire harness manufacturing device according to claim 4, wherein the groove-shaped device comprises a barrier portion configured to prevent the photocurable resin from flowing out of a portion where the binding portion is to be formed, and wherein the barrier portion has a slit configured to receive the plurality of electric wires.

* * * * *